US008294103B2

(12) United States Patent
Gibbons et al.

(10) Patent No.: US 8,294,103 B2
(45) Date of Patent: Oct. 23, 2012

(54) SYSTEM AND METHOD FOR VIEWING AN AREA USING AN OPTICAL SYSTEM POSITIONED INSIDE OF A DEWAR

(75) Inventors: Robert C. Gibbons, Richardson, TX (US); Stephen H. Black, Buellton, CA (US); Richard N. Mullins, Goleta, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/280,061

(22) Filed: Oct. 24, 2011

(65) Prior Publication Data

US 2012/0037806 A1    Feb. 16, 2012

Related U.S. Application Data

(63) Continuation of application No. 11/777,020, filed on Jul. 12, 2007, now Pat. No. 8,044,355.

(51) Int. Cl.
*G01J 5/04* (2006.01)
(52) U.S. Cl. .................................. 250/339.03
(58) Field of Classification Search ... 250/338.1–339.03
See application file for complete search history.

(56) References Cited

U.S. PATENT DOCUMENTS

| | | | |
|---|---|---|---|
| 4,507,551 A | 3/1985 | Howard et al. | |
| 4,783,593 A * | 11/1988 | Noble | 250/352 |
| 4,827,130 A * | 5/1989 | Reno | 250/332 |
| 5,258,618 A | 11/1993 | Noble | |
| 5,485,012 A | 1/1996 | Liebson | |
| 5,557,474 A * | 9/1996 | McCrary | 359/820 |
| 6,424,460 B1 | 7/2002 | Kirkham | |
| 6,574,055 B1 | 6/2003 | Stallard | |
| 6,747,256 B1 | 6/2004 | Tejada et al. | |
| 7,002,154 B2 | 2/2006 | Wellman et al. | |
| 2004/0179277 A1 | 9/2004 | Stallard et al. | |
| 2008/0054076 A1 | 3/2008 | Schleuning et al. | |
| 2011/0080483 A1 * | 4/2011 | Oster et al. | 348/164 |

OTHER PUBLICATIONS

PCT Notification of Transmittal of International Search Report and the Written Opinion of the International Searching Authority, or the Declaration mailed Apr. 24, 2009, regarding PCT/US2008/069135 filed Jul. 3, 2008 (16 pages).
EPO Communication pursuant to Article 94(3) EPC, dated Oct. 9, 2010, regarding Appln. No. 08 842 754.7-2217 (6 pg.).
Singer, Michael, "Design of a Cryogenic IR Detector with Integrated Optics," Semiconductor Devices, Israeli Ministry of Defense, Infrared Technology and Applications XXXVI, Proc. of SPIE, vol. 7660, 76601Z-1, © 2010 SPIE.

* cited by examiner

*Primary Examiner* — David Porta
*Assistant Examiner* — Casey Bryant

(57) ABSTRACT

According to one embodiment of the present invention, a system for viewing an area includes a dewar and an optical system positioned within the dewar. The dewar permits operation of the flux detector at cryogenic temperatures, in some embodiments. The optical system includes an infrared radiation system capable of focusing one or more light beams. The inclusion of the optical system within the cryogenic space of the dewar allows reduction of the overall system length and weight, if desired.

21 Claims, 5 Drawing Sheets

SYSTEM AND METHOD FOR VIEWING AN AREA USING AN OPTICAL SYSTEM POSITIONED INSIDE OF A DEWAR

RELATED APPLICATIONS

This application is a continuation of U.S. application Ser. No. 11/777,020 filed Jul. 12, 2007 entitled "System and Method for Viewing an Area Using an Optical System Positioned Inside of a Dewar," now U.S. Pat. No. 8,044,355.

TECHNICAL FIELD OF THE INVENTION

This invention relates generally to the field of thermal imagery and more specifically to a system and method for viewing an area using an optical system positioned inside of a dewar.

BACKGROUND OF THE INVENTION

A thermal imaging system traditionally consists of a detector, or collection of detectors, sensitive to infrared radiation, and an optical system capable of receiving and focusing said radiation onto the detector. For maximum sensitivity, the infrared detector is often cooled, typically to cryogenic temperatures. In order to maintain the detector at these cryogenic temperatures, a vacuum enclosure is required to minimize thermal losses though heat conduction. This vacuum enclosure is termed a "dewar."

Unfortunately the length of the traditional combination of an optical system and the detector/dewar is much longer than either the length of the optical system or the detector/dewar alone. This excessive length, and attendant weight, is a serious disadvantage in a number of applications, ranging from portable surveillance equipment to missile warning systems.

SUMMARY OF THE INVENTION

According to one embodiment of the present invention, a system for viewing an area includes a dewar and an optical system positioned within the dewar. The dewar permits operation of the flux detector at cryogenic temperatures, in some embodiments. The optical system includes an infrared radiation system capable of focusing one or more light beams. The inclusion of the optical system within the cryogenic space of the dewar allows reduction of the overall system length and weight, if desired.

Certain embodiments of the invention may provide one or more technical advantages. A technical advantage of one embodiment may be that positioning the optical system completely inside of the dewar reduces the size of the system. As a result, the system can be used in applications where space is limited, such as missile warning systems, portable surveillance equipment, and military aircraft. A technical advantage of a further embodiment may be that using a single material type to create the optical system allows the entire optical system to shrink at the same rate when exposed to extreme cold (cryogenic) temperatures. This prevents the optical system from either fracturing or undergoing misalignment as a result of the elements of the optical system shrinking at different rates. A technical advantage of a further embodiment may be that since the optical system resides within a cryogenic space, it is insensitive to changes in the external ambient temperature. A technical advantage of a further embodiment allows the optical system to be refocused using a collimator. Because the optical system is sealed inside of a cryogenically cooled dewar, it is not possible to refocus the optical system once the optical system is sealed inside the dewar. The use of a collimator circumvents this problem, allowing the optical system to be correctly focused in spite of it location inside the dewar.

Certain embodiments of the invention may include none, some, or all of the above technical advantages. One or more technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF EXAMPLE EMBODIMENTS OF THE INVENTION

Embodiments of the present invention and its advantages are best understood by referring to FIGS. 1A through 4 of the drawings, like numerals being used for like in corresponding parts of the various drawings.

Figure 1A:
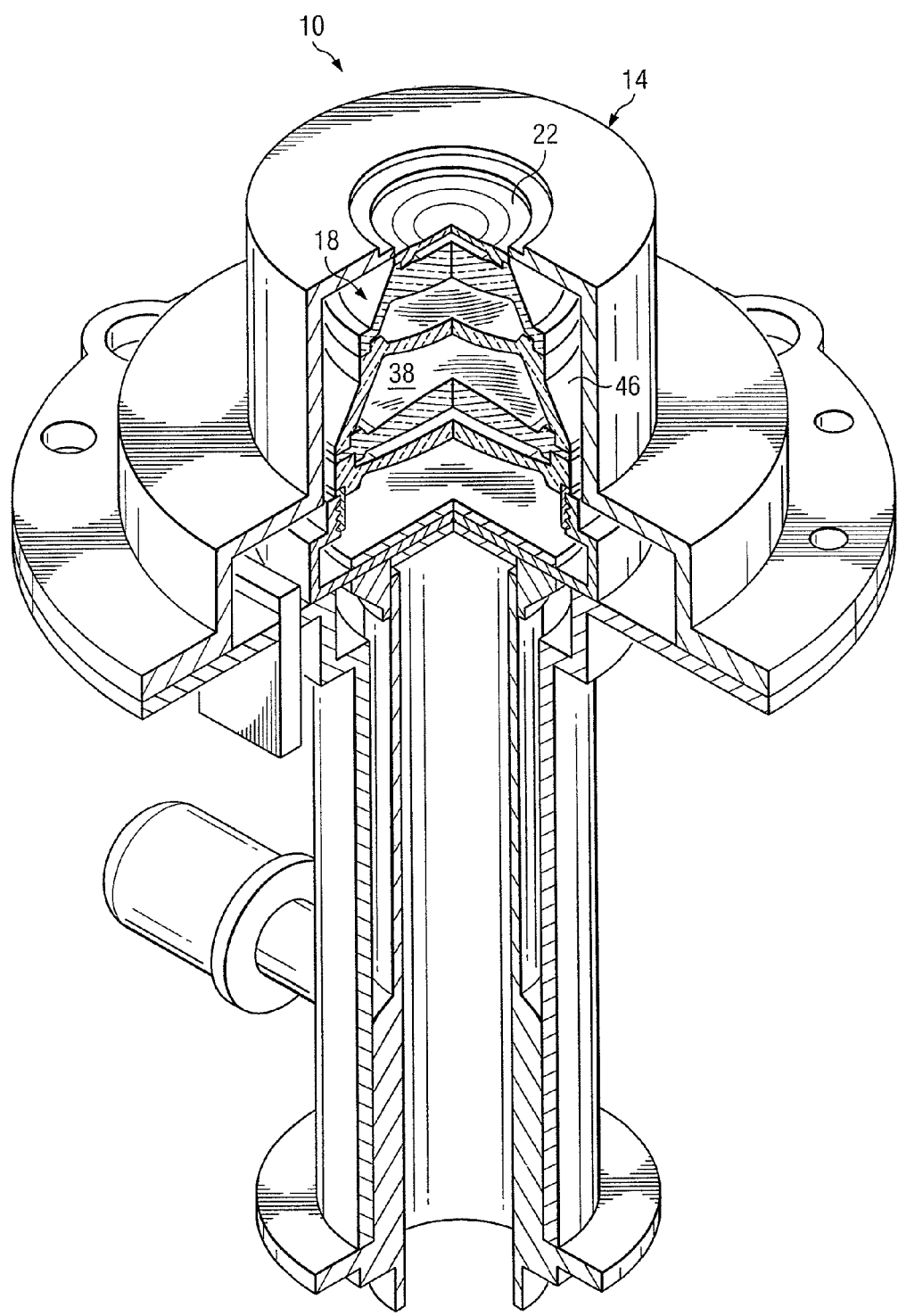
FIG. 1A is a cut out drawing illustrating one embodiment of a system capable of allowing imaging of an infrared scene.

FIG. 1A is a cut out drawing illustrating one embodiment of a system 10 capable of allowing an infrared scene to be viewed with a system of much reduced overall length. According to the illustrated embodiment, system 10 generally includes a dewar 14 and an optical system 18 disposed within dewar 14. Enclosing optical system 18 inside of dewar 14 allows the dimensions of system 10 to be reduced to only the dimensions of dewar 14, while still maintaining the full function of optical system 18. Therefore, by reducing the size of system 10, system 10 may be used for more applications. Additionally, by entirely enclosing optical system 18 inside of dewar 14, the radiation from external background sources is reduced, improving the sensitivity of a thermal image produced by the system.

Figure 2A:
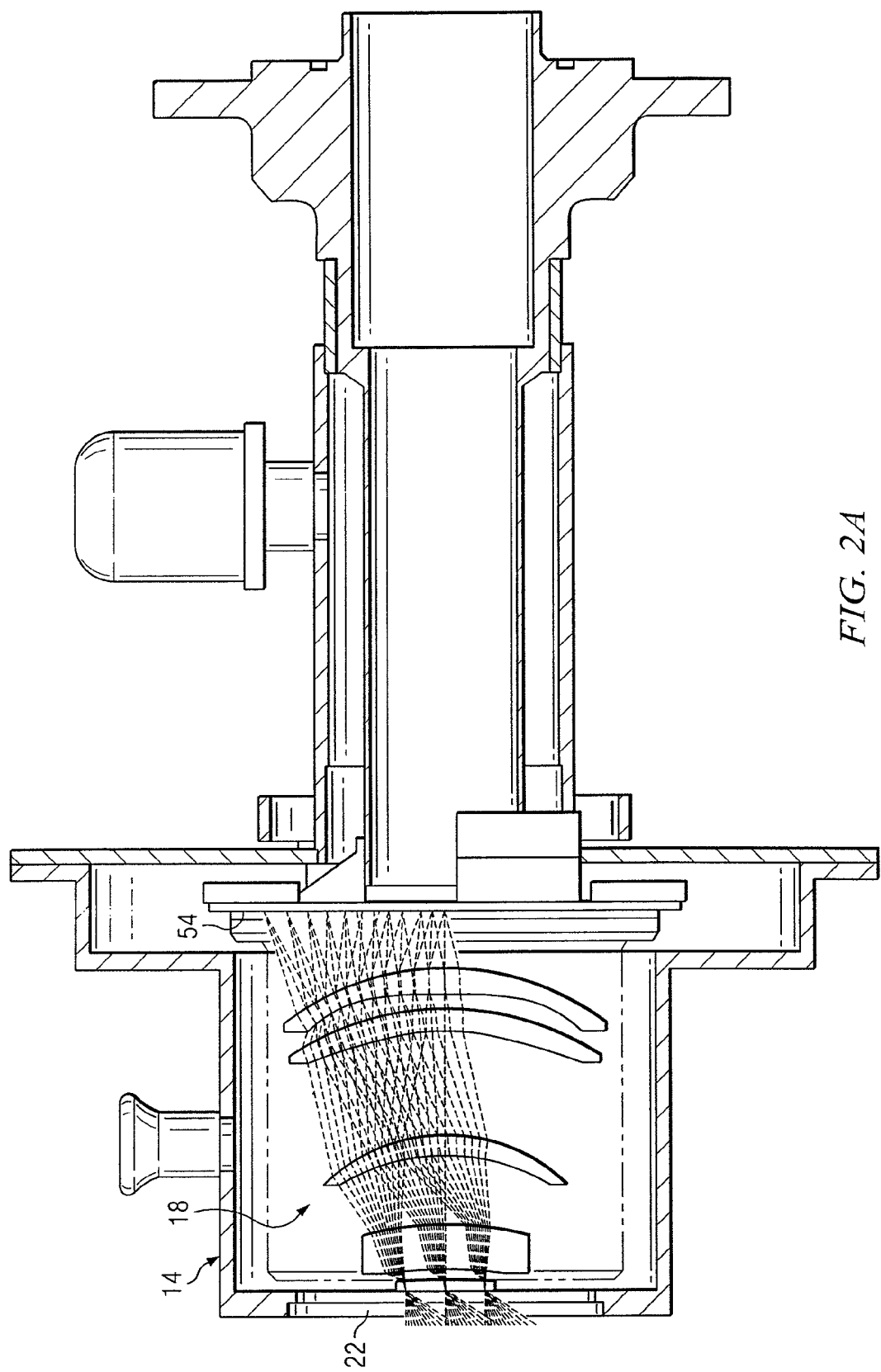
FIG. 2A is a side view of the system of FIG. 1A.
Figure 2B:
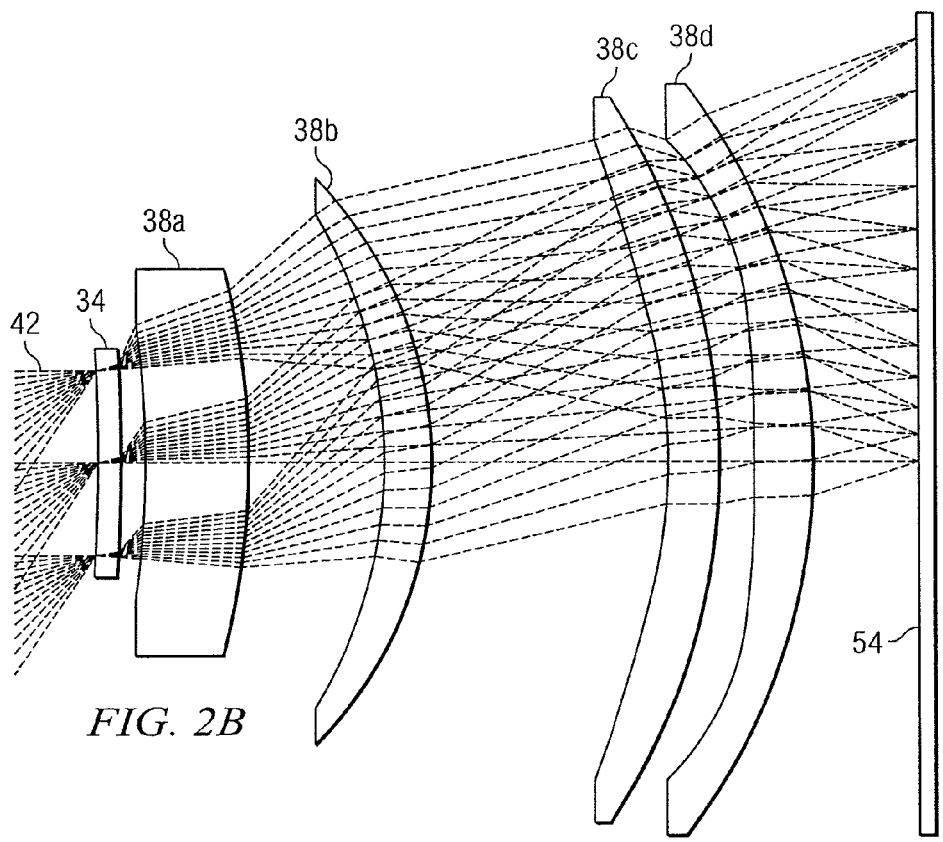
FIG. 2B is a cut out drawing illustrating one embodiment of an optical system of the system of FIG. 1A.

Dewar 14 may refer to any suitable dewar capable of maintaining cryogenic temperatures for the infrared detector 54, shown in FIGS. 2A and 2B. Dewar 14 may have any suitable length.

In the illustrated embodiment, dewar 14 further includes a dewar window 22 capable of allowing light beams to enter dewar 14. Dewar window 22 may be a window made of germanium, silicon, or other suitable material.

Optical system 18 may refer to any system capable of focusing radiation. For example, optical system 18 may include a camera, a telescope, a surveillance camera, or an infrared radiation imaging system. In the illustrated embodiment, optical system 18 (shown best in FIGS. 2A-3B) refers to a wide-angle infrared radiation imaging system, which is capable of focusing infrared radiation in order to form a thermal image. In this embodiment, the field of view ranges between 30 degrees and 150 degrees and most likely greater than 90 degrees. In the illustrated embodiment, optical system 18 further includes a non-reimaging optical system.

Figure 1B:
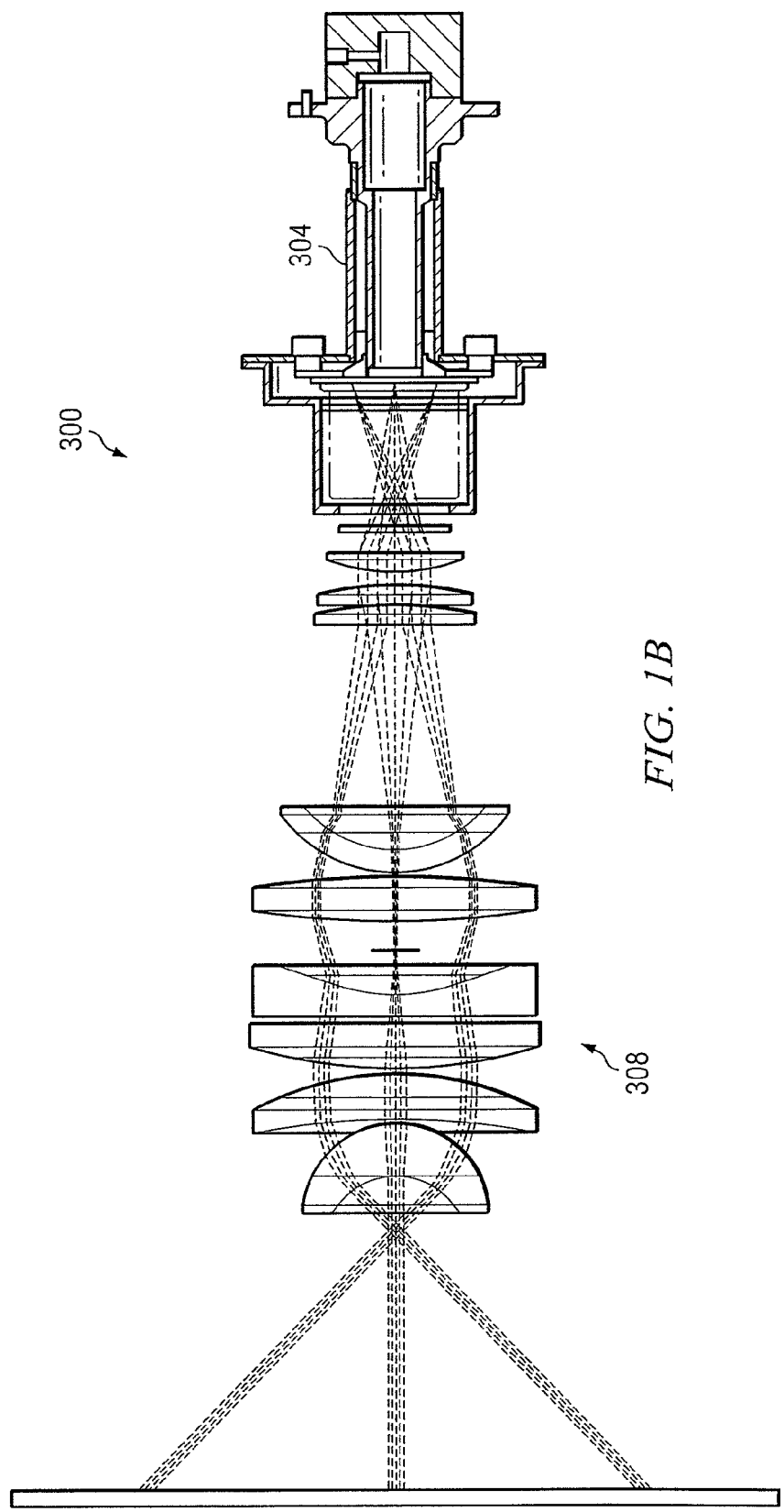
FIG. 1B shows a conventional optical system along with the detector/dewar.

In an embodiment in which optical system 18 is a non-reimaging optical system, optical system 18 forms the required infrared image without the formation of an intermediate image plane. By way of contrast, a conventional infrared optical system, such as shown in FIG. 1B, utilizes a reimaging optical system which forms an intermediate image. The intent of this intermediate image plane is to allow for the formation of an exit pupil located inside the dewar, just ahead of the detector. This exit pupil is important to reducing the undesirable infrared flux on the detector, and thus improving sensitivity. The penalty incurred in the use of a reimaging optical system is the greatly increased overall length of the optical system, again as shown in FIG. 1B.

Unfortunately, keeping the infrared detector at a very low temperature causes various problems, at least one of which is illustrated in FIG. 1B. FIG. 1B shows a conventional infrared system comprised of an optical system 308, and a separate detector/dewar 304. The overall length of the total system is the sum of 308 and 304. In the illustrated embodiment, system 300 includes a dewar 304, with a length of $L_1$, and an optical system 308, with a length of $L_2$. To keep the infrared detector at a low temperature, optical system 308 is coupled to dewar 304. As a result, the length of prior art system 300 is the combination of the length of optical system 308 and dewar 304. Various applications of a thermal imaging system (e.g. missile warning system in a military aircraft), however, require that the imaging system be very small. Therefore, for example, a system having a combined length of optical system 308 and dewar 304 is undesirable, and may also be unusable in future aircraft designs.

Certain embodiments of the present invention can significantly reduce the overall length of an infrared optical system. To facilitate this reduction in size, in one embodiment, the optical system is enclosed within the cryogenic space of the dewar to combine the reduced background flux of a conventional reimaging optical system with a greatly reduced overall length. Additional details of optical system 18 are described with reference to FIGS. 2A-3B.

Placing the optical system within a dewar is counterintuitive for a number of reasons. One fundamental problem involves the difficulty of maintaining optical alignment when the optical system must undergo large temperature excursions between room temperature and operating cryogenic temperature. Additionally, the mechanical stresses involved in this repeated cooling can lead to stress induced failure of the optical materials themselves. For instance, as a material is cooled, the material shrinks. For an optical system, this effect impacts both the optical materials and the housing material that holds the lenses. Furthermore, as a result of different properties of each material, each material shrinks at a different rate when cooled. Thus, if an optical system includes various components, each component consisting of a different material, each component would shrink at a different rate and cause the optical system to break.

Additionally, even if all of the components included in the optical system consist of the same material, causing all the components to shrink at the same rate, the optical system will defocus and render the optical system incapable of focusing the light beams into a discernable thermal image. Once the optical system is sealed inside of a dewar operating at cryogenic temperature, attempts to focus the optical system would be impossible.

The teachings of the invention recognize the advantages that may flow from placing an optical system within the dewar, and also recognize ways to address problems that would render difficult such placement. In the illustrated embodiment, optical system 18 includes components made of a single material. Because these components are made of a single material, the very low temperature of dewar 14 shrinks the size of each component by the same rate. In doing so, optical system 18 shrinks as a whole, keeping optical system 18 from undergoing mechanical fracture. Furthermore, the illustrated embodiment of system 10 is capable of being refocused using an external collimator, thus, alleviating the problem of refocusing an optical system inside of a sealed and cryogenically cooled dewar. Additional details are described in conjunction with FIGS. 2A-4.

FIG. 2A is a side view of system 10 according to one embodiment of the present invention. In the illustrated embodiment, system 10 includes optical system 18 (further discussed in reference to FIGS. 2B-3B) disposed within dewar 14. Dewar 14 further includes dewar window 22 capable of allowing light beams 42 to enter dewar 14.

Light beams 42 may refer to one or more suitable light waves. For example, light beams 42 may include ultraviolet light waves, visible light waves, infrared light waves, or any other suitable light waves, including combinations thereof. In the illustrated embodiment, light beams 42 include one or more infrared light waves.

FIG. 2B is a cut out drawing illustrating optical system 18 of the embodiment of system 10 referenced in FIG. 2A. Optical system 18 generally includes an aperture stop 34, one or more lenses 38, one or more mounted surfaces 46 (further discussed in reference to FIGS. 3A and 3B), and an infrared detector 54. Because optical system 18 is located inside of dewar 14, each of the components of optical system 18 must be capable of enduring a wide range of temperatures. In the illustrated embodiment, the components of optical system 18 are capable of focusing light beams 42 while being cooled to temperatures ranging between −320 degrees Fahrenheit and −346 degrees Fahrenheit. In order to achieve this capability, optical system 18 may be formed from, for example, a single material type. In the illustrated embodiment, optical system 18 is formed from silicon. In a further embodiment, optical system 18 may include germanium. Those skilled in the art can envision other materials that may be suitable using this design philosophy.

Aperture stop 34 may refer to any suitable device capable of controlling an intensity of light beams 42 received by infrared detector 54. In one embodiment, aperture stop 34 is formed of a single material type. In the illustrated embodiment, aperture stop 34 is formed from metal deposited on a silicon lens.

Lenses 38 may refer to any suitable devices capable of bending light beams 42. For example, lenses 38 may be formed from any suitable material type. In the illustrated embodiment, lenses 38 are formed from a single material type: silicon. In the illustrated embodiment, lenses 38 include lenses 38a-d stacked together. This stacking of lenses 38a-d, for example, allows light beams 42 to be bent repeatedly at each lens 38a-d in order for optical system 18 to focus the view of an area. In another embodiment, lenses 38 are further capable of being stacked by mounted surfaces 46, as is seen in FIG. 3A.

Infrared detector 54 may refer to any suitable device capable of receiving light beams 42 and further capable of using light beams 42 to allow system 10 to generate a thermal image of a view of an area. In one embodiment, infrared detector 54 is formed from a single material type. In the illustrated embodiment, infrared detector 54 is formed from indium antimonide. In one embodiment, infrared detector 54 is cooled by dewar 14 so that infrared detector 54 is capable of detecting the level of photon energy in various components of the light beams 42. By determining the level of energy in various light beams 42, infrared detector 54 allows system 10 to generate a thermal image of a view of an area.

In the illustrated embodiment, optical system 18 further incorporates reflective surfaces on the external portions of the optical system. These reflective surfaces are capable of further improving the ability of the system to reduce radiation from light beams 42.

Figure 3A:
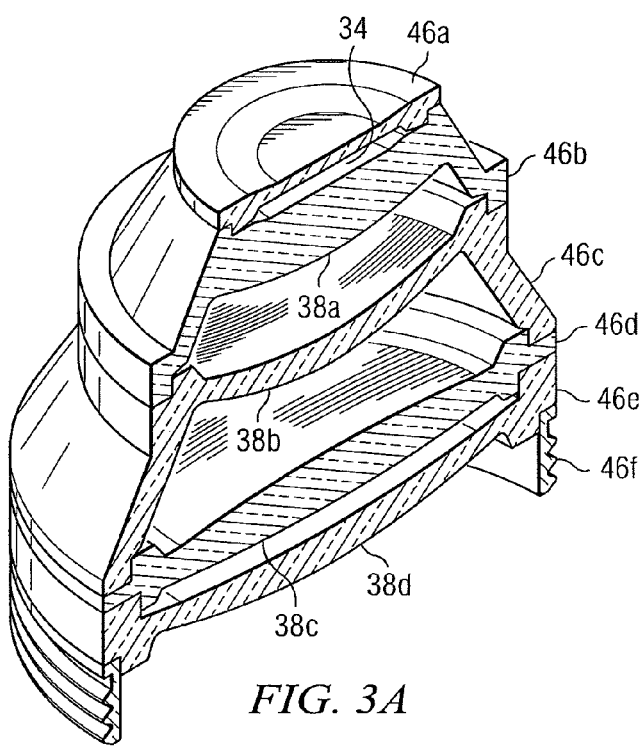
FIG. 3A is a cut out drawing illustrating one embodiment of an optical system of the system of FIG. 1A.

FIG. 3A is a cut out drawing illustrating an embodiment of optical system 18. In the illustrated embodiment, mounted surfaces 46 includes mounted surfaces 46a-f. Mounted surface 46a is coupled to mounted surface 46b. Additionally, mounted surface 46b is coupled to both 46a and 46c. Following a substantially similar pattern, mounted surfaces 46c-f are each coupled to respective mounted surfaces 46c-f. As a result, lenses 38a-d and aperture stop 34 are stacked together, as seen in FIG. 2B. Mounted surfaces 46c-f preferably made of the same material as are the lenses 38a-d. This glass-to-glass joining of similar materials permits the illustrated optical system to survive repeated cycles to cryogenic temperatures without suffering mechanical fracture, or optical misalignment. A different material may be used for the mounted surfaces 46c-f than is used for lenses 38a-d in order to achieve particular properties such as a particular coefficient of thermal expansion. Mounted surfaces 46f is further capable of coupling with dewar 14, allowing optical system 18 to be located within dewar 14, as is seen in FIGS. 1A and 2A.

Figure 3B:
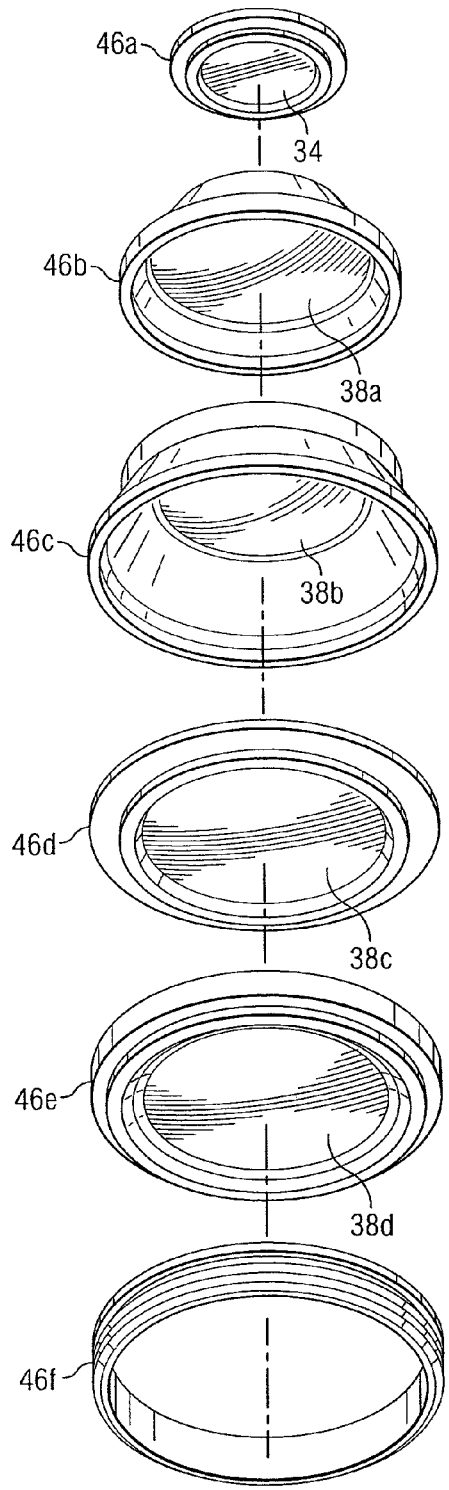
FIG. 3B is an exploded diagram illustrating the individual elements of the optical system of FIG. 3A.

FIG. 3B is an illustration of one embodiment of optical system 18. In the illustrated embodiment, mounted surfaces 46 are further capable of being separated from their coupling with one or more mounted surfaces 46, allowing access to lenses 38a-d and aperture stop 34. Mounted surfaces 46 are further capable of being recoupled with one or more mounted surfaces 46, enabling optical system 18 to be put back together. In the illustrated embodiment, mounted surfaces 46 may be created according to U.S. Patent Application Publication No. 2004/0179,277, which is incorporated herein by reference.

According to an embodiment of system 10 illustrated in FIGS. 1A and 2A, optical system 18 is located inside of dewar 14. As a result of the location of optical system 18, optical system 18 is subjected to cryogenic temperatures that will cause optical system 18 to change its focus position, inhibiting its ability to focus light beams 42. This is a fundamental problem associated with mounting an optical system wholly within a cryogenic space. To alleviate this problem, system 10, in one embodiment, is capable of being refocused.

Figure 4:
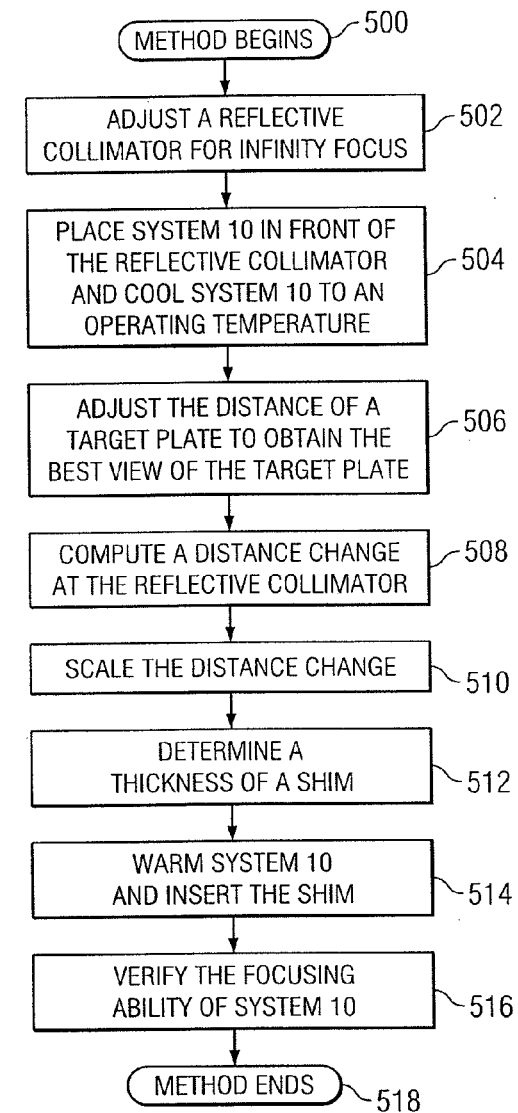
FIG. 4 is flowchart illustrating one embodiment of a method for focusing a system comprising an optical system located inside of a dewar.

FIG. 4 is flowchart illustrating one embodiment of a method for refocusing an embodiment of system 10 with optical system 18 located inside of dewar 14. In one embodiment, system 10 must be refocused because the temperature inside of dewar 14 causes optical system 18 to shrink and unfocus. The method begins at step 500. At step 502, a collimator is adjusted for infinity focus. This collimator may refer to any device capable of generating light beams which appear to originate at an infinite distance, or, in other words, so as to only allow the light beams travelling parallel to a specified direction through the device.

At step, 504, system 10 is mounted in front of the collimator and is cooled to its operating temperature. In one embodiment, system 10 is cooled to an operating temperature by filling dewar 14 with a cold substance such as liquid helium. According to one embodiment, system 10 is cooled by filling dewar 14 with liquid nitrogen. In a further embodiment, cooling system 10 is accomplished using a temporary cover for dewar 14, allowing dewar 14 to be opened up in order to refocus optical system 18.

Once system 10 is cooled and is capable of viewing an area, system 10 is used to view a target plate by means of the collimator. At step 506, the distance of the target plate is adjusted to obtain the best view of the target plate. In one embodiment, this step includes viewing the target plate using the thermal image generated by system 10. Based on the change in distance of the target plate, a distance change at the collimator is computed at step 508.

The distance change at the reflective collimator is scaled to a distance correlating to system 10 at step 510. In one embodiment, this scale is determined by the longitudinal magnification of the reflective collimator relative to the system 10. In a further embodiment, this ratio is 300:1. At step 512, the scale is used to determine a thickness of a shim be added to system 10 in order to allow optical system 18 to properly focus light beams 42. The shim may refer to any device operable to be added to system 10 in order to allow optical system 18 to properly focus light beams 42.

At step 514, system 10 is warmed and the proper shim is inserted into system 10. In one embodiment, the shim is added to optical system 18 in order to correctly space lenses 38, enabling light beams 42 to be bent in order to focus the view of an area. Once the shim has been added to system 10, the temporary cover is put back on system 10 and system 10 is once again cooled to an operable temperature. At step 516, the focusing ability of system 10 is verified. Once the focusing ability of system 10 has been verified, system 10 is once again warmed, the temporary cover is removed, and a permanent cover is added to system 10. The method ends at step 518.

Certain embodiments of the invention may provide one or more technical advantages. A technical advantage of one embodiment may be that positioning the optical system completely inside of the dewar reduces the size of the system. As a result, the system can be used in applications where space is limited, such as missile warning systems, portable surveillance equipment, and military aircraft.

A technical advantage of a further embodiment may be that using a single material type to create the optical system allows the entire optical system to shrink at the same rate when exposed to extreme cold (cryogenic) temperatures. This prevents the optical system from either fracturing or undergoing misalignment as a result of the elements of the optical system shrinking at different rates.

A technical advantage of a further embodiment may be that since the optical system resides within a cryogenic space, it is insensitive to changes in the external ambient temperature.

A technical advantage of a further embodiment allows the optical system to be refocused using a collimator. Because the optical system is sealed inside of a cryogenically cooled dewar, it is not possible to refocus the optical system once the optical system is sealed inside the dewar. The use of a collimator circumvents this problem, allowing the optical system to be correctly focused in spite of it location inside the dewar.

Although embodiments of the invention and its advantages are described in detail, a person skilled in the art could make various alterations, additions, and omissions without departing from the spirit and scope of the present invention as defined by the appended claims.

What is claimed is:

1. A system, comprising:
   a vacuum enclosure including an optical window configured to allow one or more light beams to enter the vacuum enclosure, the vacuum enclosure configured to selectively reduce a temperature within the vacuum enclosure from an ambient temperature to a cryogenic temperature; and an infrared optical system sealed entirely within the vacuum enclosure, the optical window and the infrared optical system configured to provide, without employing focusing lenses external to the vacuum enclosure, an in-focus view of an area based on the one or more light beams while the infrared optical system is at the cryogenic temperature, the infrared optical system comprising a lens coupled to at least one mounted surface supporting the lens, wherein the lens is made of a same material type as the at least one mounted surface.

2. The system of claim 1, wherein the infrared optical system comprises a plurality of lenses each coupled to the at least one mounted surface, the lenses and the at least one mounted surface configured to provide the in-focus view of the area and all sealed entirely within the vacuum enclosure, wherein the plurality of lenses and the at least one mounted surface are spaced apart from internal sidewalls and wherein all of the lenses are each made of the same material type as the at least one mounted surface.

3. The system of claim 1, wherein the plurality of lenses and the at least one mounted surface form a generally conical structure with an outer surface spaced apart from the internal sidewalls for the vacuum enclosure.

4. The system of claim 1, wherein the material type comprises one of silicon and germanium.

5. The system of claim 1, wherein the infrared optical system further comprises:
a flux detector operable to receive one or more light beams; and
an aperture stop configured to control an intensity of the one or more light beams received by the flux detector.

6. The system of claim 5, wherein the optical window and the infrared optical system are configured to provide an in-focus view of a far field area.

7. The system of claim 5, wherein the flux detector comprises an infrared detector.

8. The system of claim 1, wherein the infrared optical system further comprises a non-reimaging infrared optical system.

9. The system of claim 1, wherein the infrared optical system further comprises a reflective outer surface on the at least one mounted surface.

10. The system of claim 1, wherein the infrared optical system is configured to provide a field of view between 30 degrees and 150 degrees.

11. A method, comprising:
providing a vacuum enclosure including an optical window configured to allow one or more light beams to enter the vacuum enclosure;
providing a cooler configured to selectively cool an interior of the vacuum enclosure from an ambient temperature to a cryogenic temperature;
sealing an infrared optical system entirely within the vacuum enclosure; and
configuring the optical window and the infrared optical system to provide, without employing focusing lenses external to the vacuum enclosure, an in-focus view of an area based on the one or more light beams while the infrared optical system is at the cryogenic temperature, the infrared optical system comprising a plurality of lenses coupled to one or more mounted surfaces supporting the lenses, wherein all of the lenses are each made of a same material type.

12. The method of claim 11, wherein the lenses and the one or more mounted surfaces are spaced apart from internal sidewalls of a housing and wherein the lenses are each made of the same material type as the one or more mounted surfaces.

13. The method of claim 11, wherein the plurality of lenses and the one or more mounted surfaces form a generally conical structure with an outer surface spaced apart from the internal sidewalls for the vacuum enclosure.

14. The method of claim 11, wherein the material type comprises one of silicon and germanium.

15. The method of claim 11, wherein the infrared optical system further comprises:
a flux detector configured to receive one or more light beams focused by the lenses: and
an aperture stop configured to control an intensity of the one or more light beams received by the flux detector.

16. The method of claim 15, wherein the vacuum enclosure includes a window configured to allow the one or more light beams to enter the vacuum enclosure.

17. The method of claim 15, wherein the flux detector comprises an infrared detector.

18. The method of claim 11, wherein the infrared optical system further comprises a non-reimaging infrared optical system.

19. The method of claim 11, wherein the infrared optical system further comprises a reflective outer surface on the one or more mounted surfaces.

20. The method of claim 11, wherein the infrared optical system is configured to provide a field of view between 30 degrees and 150 degrees.

21. A system, comprising:
a vacuum enclosure including an optical window configured to allow one or more light beams to enter the vacuum enclosure, the vacuum enclosure configured to selectively reduce a temperature within the vacuum enclosure from an ambient temperature to a cryogenic temperature;
an infrared optical system sealed entirely within the vacuum enclosure, the optical window and the infrared optical system configured to provide, without employing focusing lenses external to the vacuum enclosure, an in-focus view of an area based on the one or more light beams while the infrared optical system is at the cryogenic temperature, the infrared optical system comprising:
one or more lenses coupled to one or more mounted surfaces supporting the lenses, wherein at least one of the one or more lenses is made of a first material type and at least one of the one or more mounted surfaces is made of a second material type, the second material type selected based on a relationship of a coefficient of thermal expansion for the second material type to a coefficient of thermal expansion for the first material type;
a flux detector operable to receive the one or more light beams entering the vacuum enclosure through the optical window and focused by the one or more lenses; and
an aperture stop operable to control an intensity of the one or more light beams received by the flux detector,
wherein the infrared optical system is operable to provide a field of view between 30 degrees and 150 degrees.

* * * * *